Feb. 3, 1948.  H. T. BOOTH  2,435,338
OIL CONTROL VALVE
Original Filed July 29, 1942

Inventor
Harry T. Booth,
By Carleton B. Stevens
Attorney

Patented Feb. 3, 1948

2,435,338

UNITED STATES PATENT OFFICE 2,435,338

OIL CONTROL VALVE

Harry T. Booth, Glencoe, Ill., assignor to United Aircraft Products, Inc., Dayton, Ohio, a corporation of Ohio Original application July 29, 1942, Serial No. 452,763. Divided and this application December 5, 1942, Serial No. 467,995

2 Claims. (Cl. 277—19)

This invention relates to an oil control valve, particularly for use with thermostatic and other controls for lubricating oil circulating systems with coolers as employed in connection with airplane engines. This application is a division of my application for Thermostatic controls for lubricating systems, Serial No. 452,763, filed July 29, 1942, which issued on December 30, 1947, as Patent No. 2,433,420.

In airplane engine lubrication systems it has been the practice to employ a main pressure pump in the oil supply conduit leading from the oil tank to the engine for supplying the lubricating oil under pressure to the engine parts, and a scavenge pump for returning the oil through a return conduit to the oil tank. Such a system is provided with a cooler and its warm-up jacket inserted in the return line and the oil is forced therethrough under pressure by the scavenge pump. In such systems it is essential to direct the passage of the scavenged oil through the cooler and its bypass and to provide some form of pressure relief to prevent bursting of the cooler or pipe lines due to congealing of the oil.

The primary object of the present invention therefore is to provide an improved oil control and relief valve for that purpose, and this valve may be arranged for automatic operation by control elements in the system such as particularly set forth in the above mentioned parent application.

Another object of the invention is to obtain a multi-way pressure fluid control valve characterized by rotatable perforated disks mounted on a common operating shaft, at least one of said disks being movable axially along the shaft to permit of a pressure relief action.

Other objects and structural details of the invention will appear from the following description when read in connection with the accompanying drawings, wherein.

Figure 1:
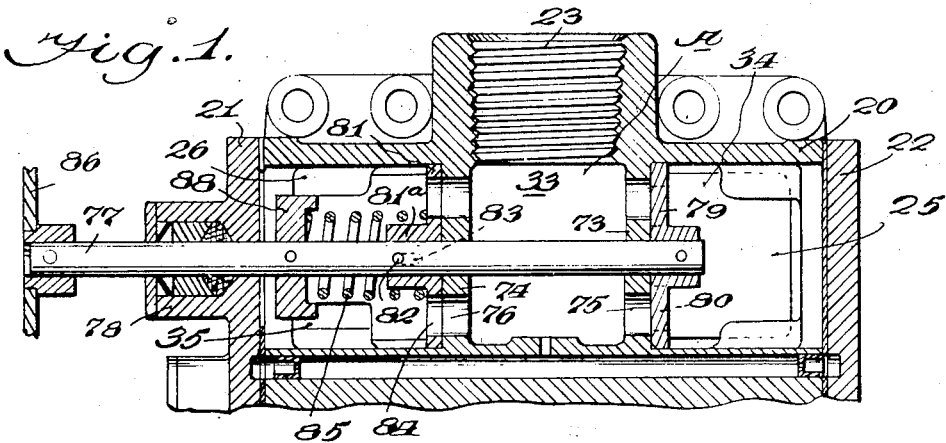
Fig. 1 is a fragmentary view in longitudinal section of an automatic controller disclosed in the prior application Serial No. 452,763, the illustrated portion of the controller showing the multi-way valve of this invention.

In the automatic controller of the aforementioned prior application a plurality of functionally related devices are incorporated into a single unit. One such device is the multi-way valve hereof, and for convenience of illustration, such valve is here disclosed as a part of such unit. A fragmentary section of the controller appears in Fig. 1, wherein an oil control valve A forming the subject matter of this application is shown in one practical form that it may assume. As shown, valve A is mounted in a housing 20 having cooperating end plates 21 and 22 secured thereto by bolts compressing sealing gaskets between them and the ends of the casting. The housing 20 is provided with an internally threaded inlet 23 adapted to be connected to a source of pressure fluid, as with the conduit leading from the scavenge pump of an engine lubrication system. Outlets are provided for the discharge of the oil from the housing, including a pair of ports 25 and 26 opening through the base of the housing.

Figure 2:
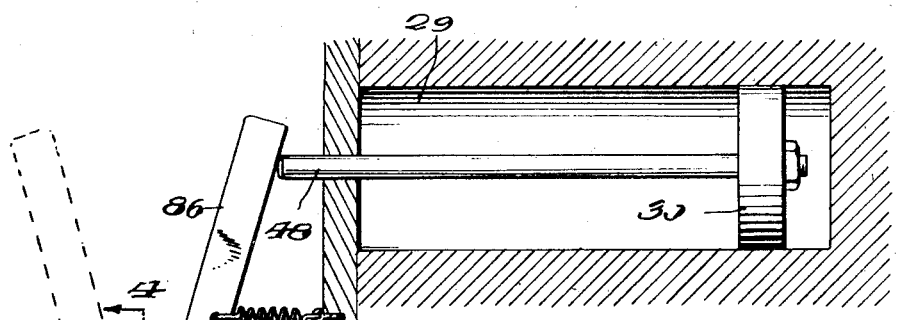
Fig. 2 is a detail fragmentary view showing a power operating means for the multi-way valve.
Figure 3:
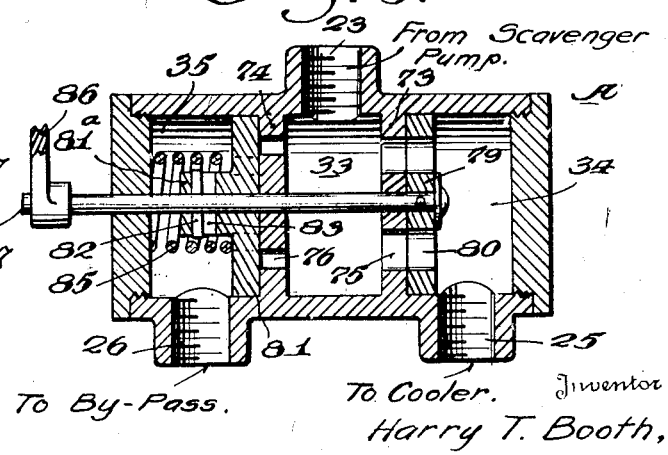
Fig. 3 is a diagrammatic illustration of the multi-way valve.

Operation of the valve may be accomplished through manual means or through power means the action of which is automatically initiated. Referring to Fig. 2, power means for the valve illustrated takes the form of a fluid pressure cylinder 29 wherein a piston 30 having a stem 48 is reciprocable. According to the function of the automatic controller the piston 30 occupies a position at one end of the cylinder 29 when the lubricating oil is cold and not in the need of cooling, and occupies a position at the opposite end of the cylinder when the lubricating oil is heated and must be cooled. Utilization of the varying positions of adjustment of the piston 30 may be made to operate the multi-way valve A.

Inlet 23 of the valve housing opens into a chamber 33 which lies intermediate and is aligned with other chambers 34 and 35, a pair of partitions 73 and 74 constituting the separating walls between the several chambers.

Chamber 34 overlies and communicates with housing outlet 25, while chamber 35 overlies and communicates with housing outlet 26. The partitions 73 and 74 have respective series of ports 75 and 76 affording communication between the chamber 33 and the chambers 34 and 35.

A rotary shaft 77, extends axially into the chambers 33, 34 and 35 and through a stuffing box 78, formed on end plate 21, and is journaled in the partitions 73 and 74 centrally of the ports 75 and 76, which surround this shaft and are conveniently arranged in line with each other and at 90° angles around the shaft axis.

On shaft 77 within chamber 34 is rigidly mounted a rotary disk valve 79, which is provided with ports 80, similar to ports 75, in partition 73, so that when shaft 77 is rotated approximately 45°, the ports 75, in partition 73, become uncovered by the disk valve 79 when the ports 80, are aligned with ports 75, to provide a maximum free passageway for oil flow therethrough into outlet chamber 34, and port 25.

Similarly a disk valve 81, is mounted on the shaft 77 within chamber 35, so that this valve 81, can slide to the left on shaft 77, and be rotated by it, a pin 82 and longitudinal slot 83 in its sleeve 81a, affording a suitable connection for this purpose. This valve has ports 83, like ports 76, in partition 74 such that when valve 81 is rotated approximately 45°, the ports 76 in partition 74, are closed by the disk valve 81. The angular relationship of the left hand combination of disk 81, and partition 74, and the right hand combination of disk 79, and partition 73, is such that in one extreme position of rotation of shaft 77 the disk 79 shuts off the flow of oil through partition 73 and disk 81 permits flow through partition 74, while in the other extreme position of the shaft an opposite effect is obtained. For intermediate positions of rotation of shaft 77 the flow is split, a part of the oil stream passing through each partition 73 and 74.

A spring 85, has one end pressing valve 81, against partition 74, and the other end is anchored to shaft 77, by means of a collar 88, secured thereto so that it tends to push shaft 77, to the left, holding disk valve 79, against partition 73. The strength of spring 85, is governed by conditions of overload pressure in order that the spring will yield to the attainment of a predetermined pressure in chamber 33.

A lever arm 86, is secured to the outer end of shaft 77, and, according to the illustration in Fig. 2, it engages the end of operating cylinder piston shaft 48, a spring 87 operating to maintain the lever arm in engagement with the piston shaft. Motion of the piston 30 in cylinder 29, therefore, is transmitted through lever 86 to shaft 77, effecting rotation of the shaft and thereby of the valve disks 79 and 81.

If it be assumed, as is the case in the aforementioned prior application, that motion of the piston 30 is initiated by changes in oil temperature, and that the valve outlets 25 and 26 are respectively connected to the oil cooler and an oil cooler by-pass, then the valve disks 79 and 81 will assume different rotative positions under different temperature conditions and the oil stream will be directed alternatively to the cooler or to the cooler by-pass or will be split, with one portion going to the cooler and another portion going to the by-pass. In the event of the oil stream being directed to the cooler while a condition of congelation exists therein, a pressure relief opening of the valve disk 81 is permitted thereby to inhibit the formation of high pressures which might damage the cooler.

It is to be understood that the form of the invention herein shown and described, is to be taken as but one example or illustration thereof, and that various changes in shape, size and arrangement or combination of parts may be resorted to without departing from the spirit of the invention, as falls within the scope of the following claims.

What is claimed is:

1. An oil control valve comprising a longitudinal housing structure having a pair of partitions therein dividing the housing into an intermediate inlet chamber between two outlet chambers, said partitions having aligned valve ports therein, a rotatable shaft extending longitudinally through the chambers of said housing, disk valve elements mounted on said shaft to rotate therewith, said disk valve elements having ports therethrough corresponding with ports in the partition elements with which they cooperate, said disk valve elements being so mounted on said shaft that when the ports of one disk line up with the ports through the partition with which it cooperates the ports through the other disk will be in a midway position between the ports through the partition with which it cooperates, and at least one of said disk valve elements being movable axially along said shaft to open the ports in its cooperating partition irrespective of its position of rotational adjustment.

2. An oil control valve, comprising a longitudinal housing structure having a pair of partitions therein dividing the housing into an intermediate inlet chamber between two outlet chambers, said partitions having aligned valve ports herein, a rotatable shaft extending longitudinally through the chambers of said housing, disk valve elements mounted on said shaft to rotate therewith, said disk valve elements having ports therethrough corresponding with ports in the partition elements with which they cooperate, and a spring cooperating with the rotary shaft and one of said disk valve elements in a manner to effect normal seating engagement thereof with the partition with which it cooperates but yieldable under a predetermined fluid pressure to permit the by-pass of fluid through the ports of the partition by compressing the spring by the fluid pressure against the disk and thereby causing the disk to move longitudinally of the shaft.

HARRY T. BOOTH.

REFERENCES CITED

The following references are of record in the file of this patent:

UNITED STATES PATENTS

| Number | Name | Date |
|---|---|---|
| 1,449,074 | Tygard | Mar. 20, 1923 |
| 2,079,743 | Krieger | May 11, 1937 |
| 231,110 | Smith | Aug. 10, 1880 |
| 2,127,679 | Dudley | Aug. 23, 1938 |
| 2,188,801 | Worth | Jan. 30, 1940 |
| 2,288,599 | Ramsaur | July 7, 1942 |

FOREIGN PATENTS

| Number | Country | Date |
|---|---|---|
| 621,750 | France | Feb. 12, 1927 |
| 253,233 | Great Britain | June 17, 1926 |